(12) United States Patent
Nagai et al.

(10) Patent No.: US 7,117,181 B1
(45) Date of Patent: Oct. 3, 2006

(54) REPRODUCTION APPARATUS AND REPRODUCTION METHOD OF DIGITAL VIDEO SIGNAL OR AUDIO SIGNAL

(75) Inventors: Yutaka Nagai, Yokohama (JP); Toshifumi Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1490 days.

(21) Appl. No.: 09/290,251

(22) Filed: Apr. 13, 1999

(30) Foreign Application Priority Data

Apr. 14, 1998 (JP) ................................. 10-102385

(51) Int. Cl.
*G06Q 99/00* (2006.01)
*G11B 3/64* (2006.01)
*G11B 7/28* (2006.01)

(52) U.S. Cl. ............................ 705/57; 705/51; 386/94; 369/85

(58) Field of Classification Search ................. 705/51, 705/52, 54, 57; 369/58, 84, 85, 275, 32, 369/275.1, 275.2, 32.01; 360/60, 15; 84/609, 84/627, 663; 386/94, 109; 380/4, 24, 25
See application file for complete search history.

(56) References Cited

U.S. PATENT DOCUMENTS

| | | | | |
|---|---|---|---|---|
| 5,144,658 A | * | 9/1992 | Takahashi | 360/60 |
| 5,481,378 A | * | 1/1996 | Sugano et al. | 358/501 |
| 5,633,841 A | * | 5/1997 | Yokota et al. | 369/32 |
| 5,636,096 A | * | 6/1997 | Mardirossian | 360/133 |
| 5,648,943 A | * | 7/1997 | Omi et al. | 369/13 |
| 5,659,613 A | | 8/1997 | Copeland et al. | 380/202 |
| 5,699,474 A | | 12/1997 | Suzuki et al. | 386/68 |
| 5,715,357 A | | 2/1998 | Yamagata et al. | 386/96 |
| 5,729,516 A | * | 3/1998 | Tozaki et al. | 369/58 |
| 5,796,826 A | * | 8/1998 | Park | 380/203 |
| 5,809,007 A | * | 9/1998 | Takemura et al. | 369/275 |
| 5,815,472 A | * | 9/1998 | Kuroda et al. | 369/32 |
| 5,901,125 A | * | 5/1999 | Doi | 369/58 |

(Continued)

FOREIGN PATENT DOCUMENTS

EP 0718840 A2 * 6/1996

(Continued)

OTHER PUBLICATIONS

Johnstone, Far Eastern Economic Review, vol. 155, No. 4, p. 58, "Year of Listening Digitally," Jan. 30, 1992.*

(Continued)

*Primary Examiner*—Nicholas D. Rosen
(74) *Attorney, Agent, or Firm*—Antonelli, Terry, Stout and Kraus, LLP.

(57) ABSTRACT

Assuming that copying is permitted only once in broadcasting or the like, there is provided a reproduction apparatus and a reproduction method of digital video signal or audio signal for preventing a pirated edition disk which is produced by recording a signal onto a DVD-R disk (capable of recording the signal once), a DVD-RAM disk (rewritable), or the like and thereafter illegally copying the recorded signal to a DVD-ROM, from being reproduced by an ordinary user's player capable of reproducing DVD-ROM, DVD-R and DVD-RAM disks. Furthermore, in the case where reproduction is inhibited, the cause of the reproduction stoppage is reported correctly. In the case where the copying permission information superimposed on the video signal indicates that copying of only one generation was permitted and the disk is judged to be a DVD-ROM, reproduction is inhibited. As a result, there is inhibited reproduction from a disk which is produced by temporarily recording video or audio data permitted as to copy of one generation onto a DVD-R/RAM and thereafter illegally copying the recorded data to a DVD-ROM.

31 Claims, 4 Drawing Sheets

U.S. PATENT DOCUMENTS

| | | | | |
|---|---|---|---|---|
| 5,991,499 A | * | 11/1999 | Yagasaki et al. | 386/94 |
| 6,028,932 A | * | 2/2000 | Park | 380/203 |
| 6,034,832 A | * | 3/2000 | Ichimura et al. | 360/60 |
| 6,034,931 A | * | 3/2000 | Miwa et al. | 369/47.12 |
| 6,035,094 A | * | 3/2000 | Kori | 386/94 |
| 6,038,207 A | * | 3/2000 | Wachi | 369/275.1 |
| 6,044,157 A | * | 3/2000 | Uesaka et al. | 380/201 |
| 6,072,759 A | * | 6/2000 | Maeda et al. | 369/59 |
| 6,081,897 A | * | 6/2000 | Bersson | 713/200 |
| RE36,763 E | * | 7/2000 | Kanota et al. | 380/203 |
| 6,094,723 A | * | 7/2000 | Otsuka | 713/200 |
| 6,101,476 A | * | 8/2000 | Kamatakis et al. | 705/1 |
| 6,104,686 A | * | 8/2000 | Whitcher et al. | 369/111 |
| 6,115,533 A | * | 9/2000 | Tahara et al. | 386/94 |
| 6,209,092 B1 | * | 3/2001 | Linnartz | 713/176 |
| 6,215,745 B1 | * | 4/2001 | Sako et al. | 380/203 |
| 6,226,747 B1 | * | 5/2001 | Larsson | 713/200 |
| 6,271,887 B1 | * | 8/2001 | Ogino et al. | 348/478 |
| 6,289,102 B1 | | 9/2001 | Ueda et al. | 380/201 |
| 6,356,704 B1 | | 3/2002 | Callway et al. | 386/94 |
| 6,374,036 B1 | | 4/2002 | Ryan et al. | 386/94 |
| 6,437,933 B1 | | 8/2002 | Sugiyama et al. | 360/69 |
| 7,000,113 B1 | * | 2/2006 | Linnartz | 713/176 |
| 2001/0006578 A1 | * | 7/2001 | Usui et al. | 386/94 |
| 2001/0007608 A1 | * | 7/2001 | Sugita et al. | 386/94 |
| 2001/0011237 A1 | * | 8/2001 | Tanaka et al. | 705/27 |
| 2001/0033739 A1 | * | 10/2001 | Oguro et al. | 386/94 |
| 2001/0046101 A1 | | 11/2001 | Ogino | 360/60 |
| 2002/0007347 A1 | | 1/2002 | Blumenthal et al. | 705/51 |
| 2002/0037039 A1 | | 3/2002 | Sugahara | 375/240.01 |

FOREIGN PATENT DOCUMENTS

| | | | |
|---|---|---|---|
| JP | 8-180604 A | * | 7/1996 |
| WO | 96/41468 | | 12/1996 |

OTHER PUBLICATIONS

Starrett, CD-ROM Professional, vol. 9, No. 1, pp. 94-95, "Going Gold with Music," Jan. 1996.*

Parker, CD-ROM Professional, vol. 9, No. 12, pp. 89-90, "DVD Copy Protection: An Agreement at Last?" Dec. 1996.*

Fox, New Scientist, "Wobble Drives Pirates off the Digital Seas," (Abstract) Feb. 22, 1997, p. 22.*

Microsoft Press Computer Dictionary, p. 255, 1997.*

B. Fox, "Wobble drives pirates off the digital seas", *New Scientist*, vol. 153, Issue 2070, Feb. 22, 1997, p. 22, published by Reed Business Information, Ltd., London, U.K., ISSN 0262-4079.

*Nikkei Electronics*, No. 683, Feb. 24, 1997, pp. 99-123 (in Japanese).

*International Standard IEC 60958-3, Digital audio interface—Part 3: Consumer applications*, First edition, Dec. 1999, International Electrotechnical Commission, Geneva, Switzerland, ISBN 2-8318-5055-X (in French and English).

* cited by examiner

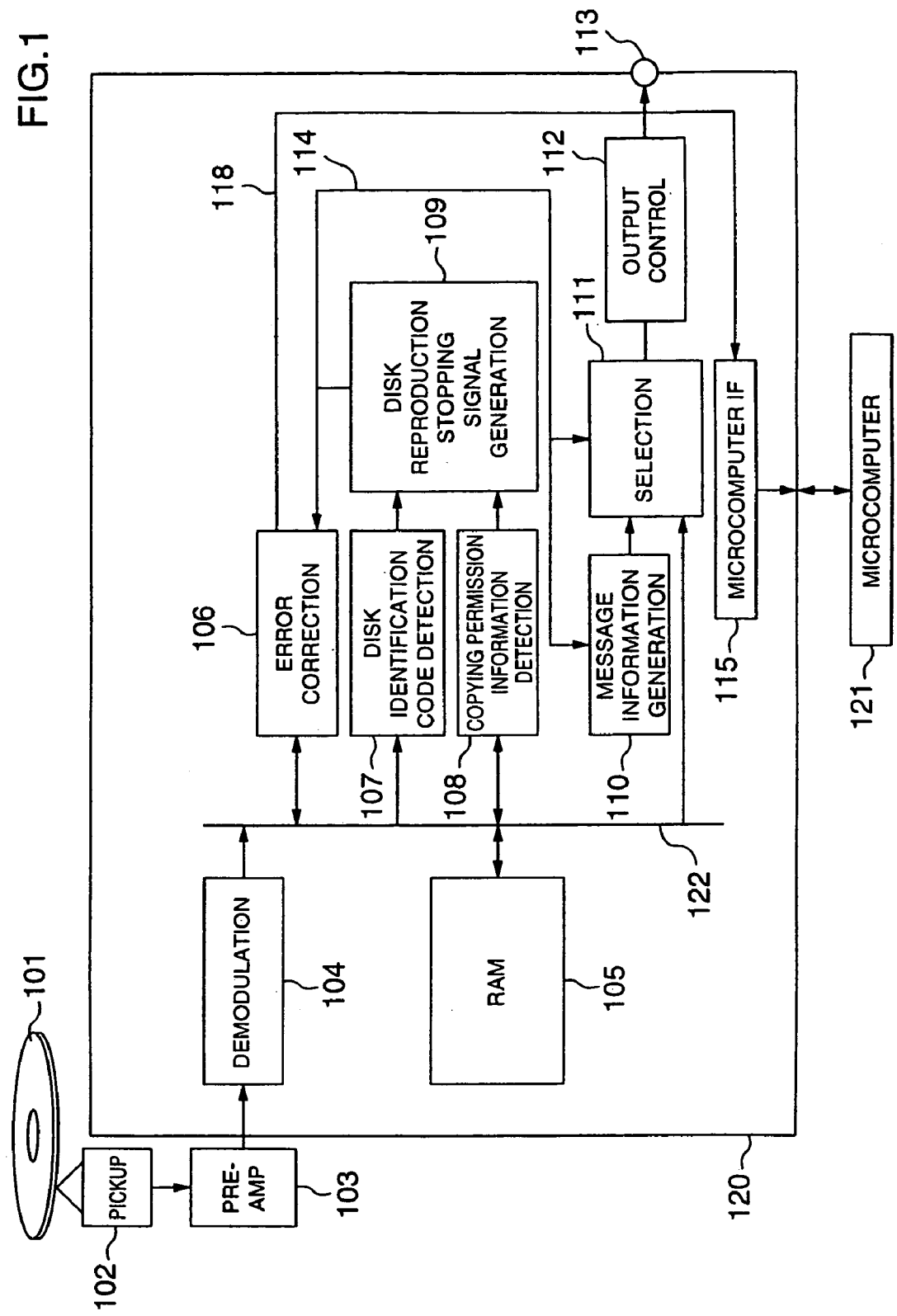

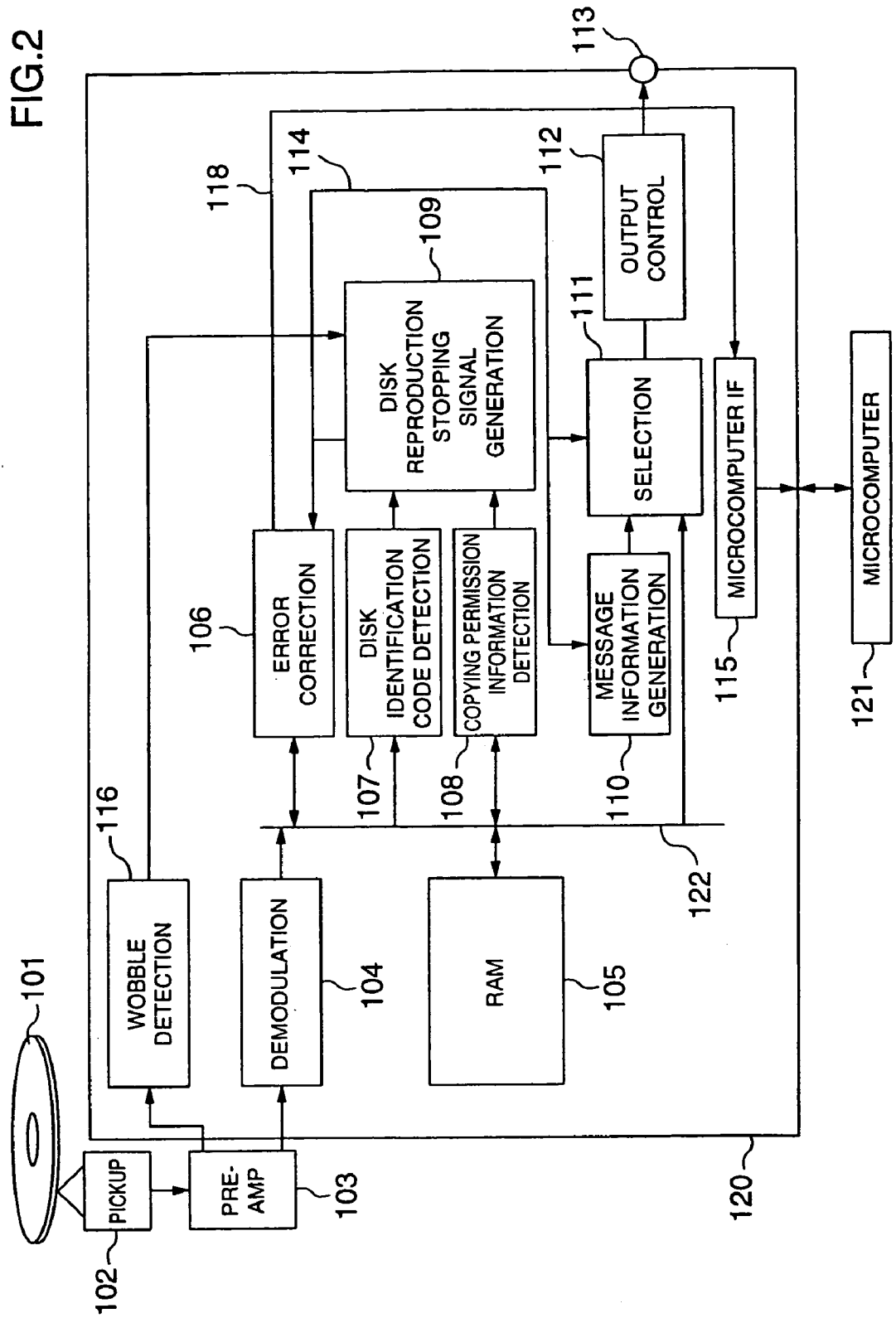

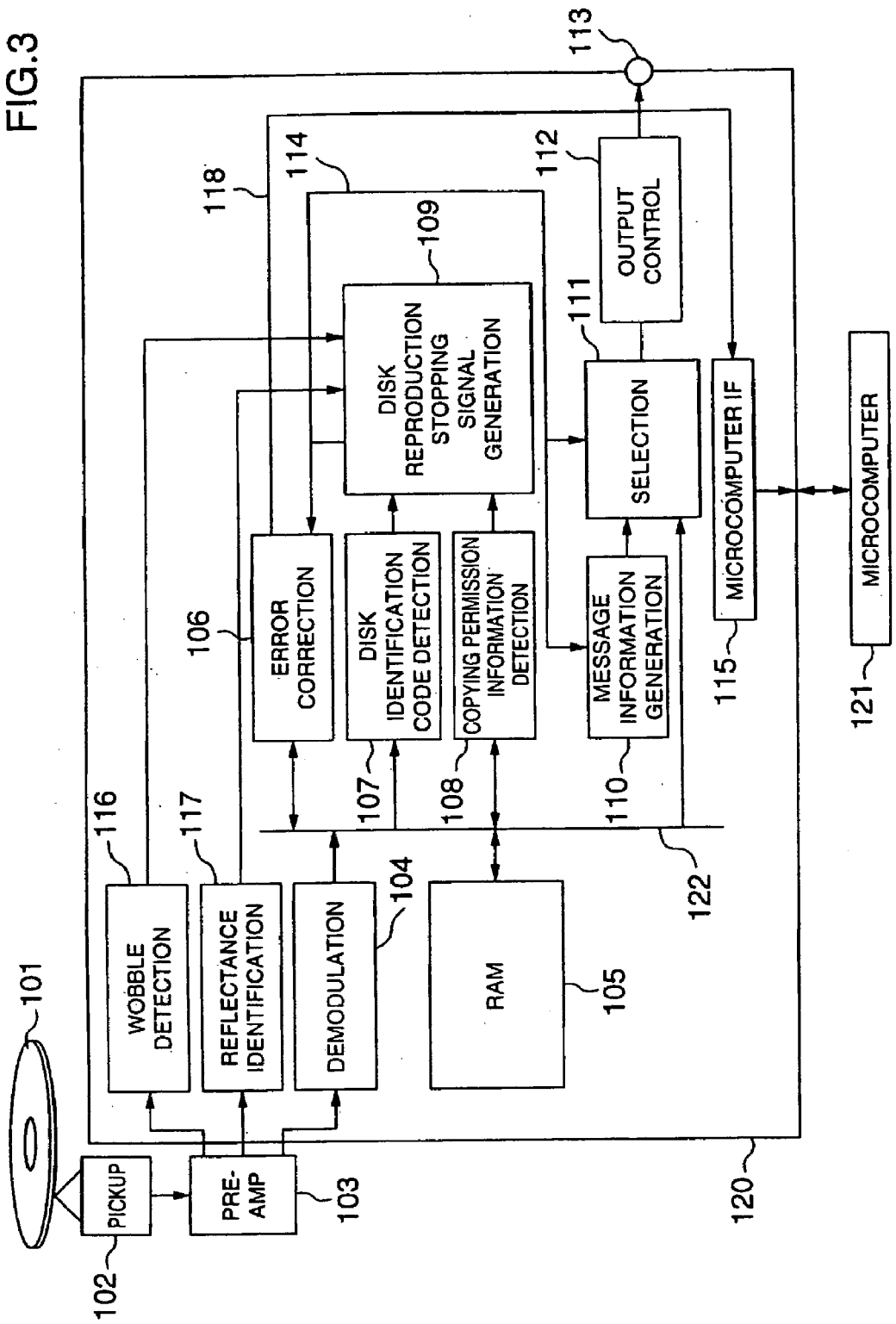

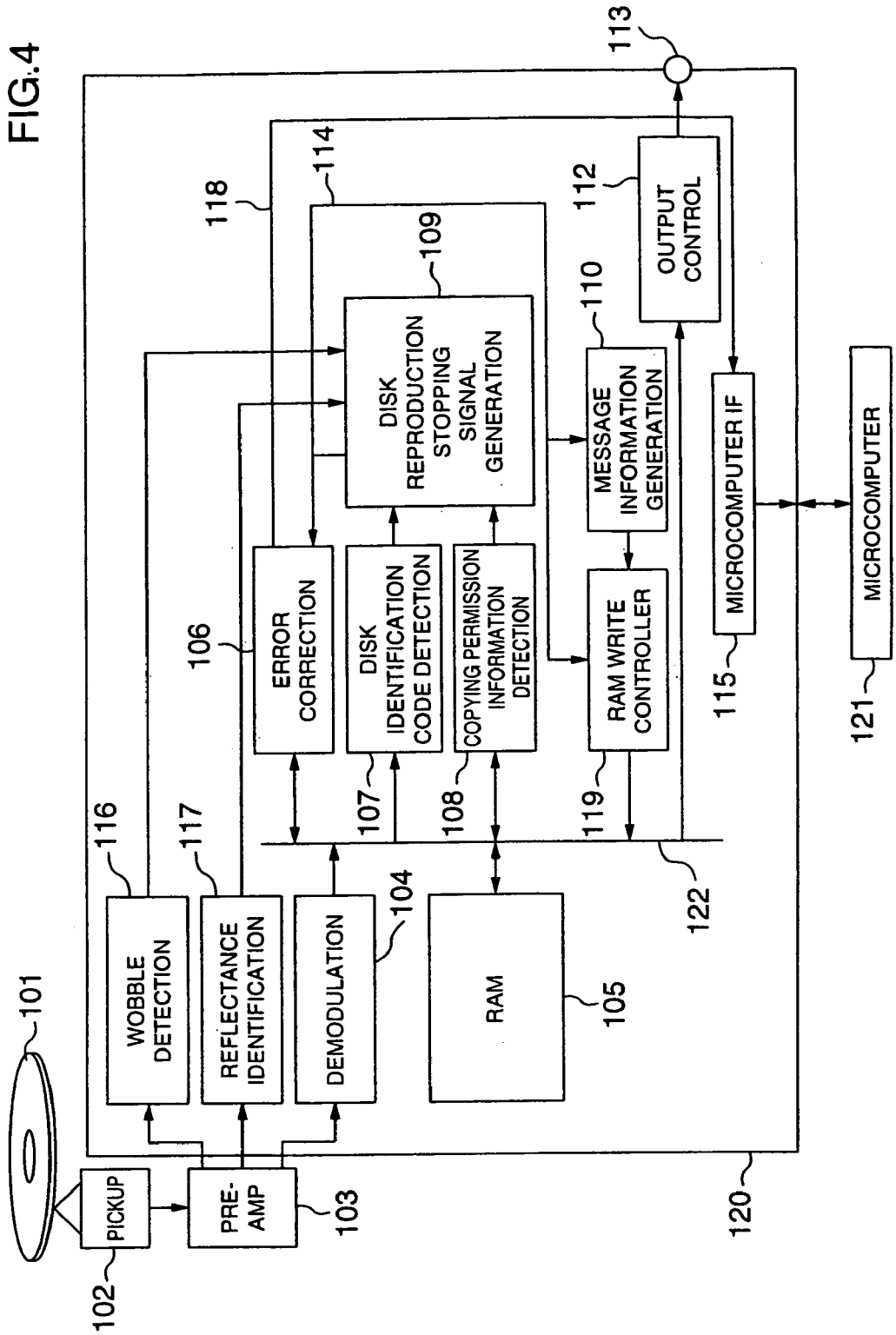

REPRODUCTION APPARATUS AND REPRODUCTION METHOD OF DIGITAL VIDEO SIGNAL OR AUDIO SIGNAL

BACKGROUND OF THE INVENTION

The present invention relates to a reproduction apparatus for a signal recorded on a medium such as an optical storage medium, and in particular to a technique making it possible to protect a copyright of the signal recorded on the medium.

A digital video disk (DVD) for recording an audio/video (AV) signal compressed by using MPEG2 has a problem that the AV signal could be copied without quality degradation because the AV signal is handled as digital data.

In opposition to this, there has been introduced a technique of an electronic watermark for superimposing information such as permission, inhibition, or permission of only one generation as to copying so that the user may not sense it as described in Nikkei Electronics, Feb. 24, 1997, pp. 99–123. In the above described technique, there is described, for example, a method for conducting copying prevention processing on analog output in accordance with a detected signal.

In the case of a medium such as a broadcasting which permits copying only once, however, it is not considered to protect a copyright by restricting reproduction, using a player of each user, of a pirated edition disk which is produced by copying a signal onto a DVD-R disk (capable of recording the signal once) or the like and thereafter further copying the signal from the DVD-R disk to a DVD-ROM.

SUMMARY OF THE INVENTION

Assuming that copying is permitted only once in broadcasting or the like, an object of the present invention is to provide a technique for preventing a pirated edition disk which is produced by recording a signal onto a DVD-R disk (capable of recording the signal once), a DVD-RAM disk (rewritable), or the like and thereafter illegally copying the recorded signal to a DVD-ROM, from being reproduced by an ordinary user's player capable of reproducing DVD-ROM, DVD-R and DVD-RAM disks.

Another object of the present invention is to report the cause of the reproduction stoppage to the user correctly in the case where reproduction is inhibited.

Originally, a medium allowing copying only once does not exist in DVD-ROM disks. In other words, it is impossible in DVD-ROMs to detect information which has permitted copying of only one generation, from video data. In the case where a signal from a medium permitting copying only once, such as broadcasting, is recorded on a recordable medium such as DVD-R/RAM and the recorded signal is copied onto a DVD-ROM to produce a pirated edition, information which has permitted copying of only one generation is detected from the video data. Therefore, in accordance with an aspect of the present invention, a means for identifying whether a disk is a DVD-R, a DVD-RAM, or a DVD-ROM, and a means for detecting superimposed or embedded information concerning permission of copying from video data are provided. If the disk is a DVD-ROM and information identifying that copying of one generation has been permitted, such as an electronic watermark and copying protect cryptographic information is detected, then reproduction from the disk is inhibited, the reason of the reproduction stoppage is provided. So, the fact that the reproduction has been stopped due to a copyright problem is reported to the user. As a result, the above described objects are achieved.

BRIEF DESCRIPTION OF THE DRAWING

FIG. 1 is a block circuit diagram of a DVD reproduction apparatus showing a first embodiment of the present invention;

FIG. 2 is a block circuit diagram of a DVD reproduction apparatus showing a second embodiment of the present invention;

FIG. 3 is a block circuit diagram of a DVD reproduction apparatus showing a third embodiment of the present invention; and FIG. 4 is a block circuit diagram of a DVD reproduction apparatus showing a fourth embodiment of the present invention.

DESCRIPTION OF THE EMBODIMENTS

A first embodiment of the present invention will now be described by referring to the drawing.

FIG. 1 is a block diagram of a DVD reproduction apparatus showing an embodiment of the present invention. Numeral 101 denotes a DVD-ROM disk, a DVD-R disk, or a DVD-RAM disk having video data or the like recorded thereon. In the present embodiment, video data or audio data having copying permission information superimposed thereon or embedded therein is recorded in each of the above described disks. The superimposed copying permission information cannot be altered without significantly degrading the quality of the original video data or audio data. A disk identification code (a code for identifying whether the disk is a disk dedicated for reproduction) is further added to the video data or audio data. Numeral 102 denotes an optical pickup for detecting a signal from the disk 101. Numeral 103 denotes a preamplifier for conducting amplification, waveform equalization, and the like on a signal detected by the optical pickup. Numeral 104 denotes a demodulation circuit for converting a reproduced signal to binary values and conducting bit synchronization and demodulation. Numeral 105 denotes a RAM for temporarily storing the reproduced data thus demodulated. Numeral 106 denotes an error correction circuit for conducting error correction processing on data demodulated and stored in the RAM 105. Numeral 107 denotes a detection circuit for detecting a disk identification code recorded on the disk together with the video data or the like. Numeral 108 denotes a detection circuit for detecting superimposed copying permission information from the video data. Numeral 109 denotes a circuit for generating a disk reproduction stopping signal 114 from the detected identification code and the copying permission information. If the disk reproduction stopping signal 114 has been generated, then the error correction circuit 106 destroys data instead of correcting data, and simultaneously generates a flag 118 indicating that an error is incorrectable. Numeral 110 denotes a message information generation circuit for generating video data (such as characters or an illustration) or an audio signal indicating that the reproduction is impossible. Numeral 111 denotes a selection circuit for selecting either data subjected to correction processing stored in the RAM 105 or message information supplied from the message information generation circuit, in accordance with the disk reproduction stopping signal 114. Numeral 112 denotes an output control circuit for conducting timing control and the like to output data from the selection circuit 111.

Numeral 113 denotes a data output terminal. Numeral 115 denotes an interface for a microcomputer. Numeral 121 denotes a microcontroller for controlling a signal processing device 120 formed of components 104, 105, 106, 107, 108, 109, 110, 111, 112, 114 and 115. Numeral 122 denotes a data/signal transfer bus among the demodulation circuit 104, the RAM 105, the error correction circuit 106, the detection circuits 107 and 108, and the selection circuit 110.

Reproduction from a disk in the present DVD reproduction apparatus will hereafter be described.

A signal recorded on the disk 101 is converted to an electric signal by the pickup 102. The electric signal is subjected in the preamplifier 103 to amplification and waveform equalization. Thereafter, in the demodulation circuit 104, the reproduced signal is converted to binary values, and subjected to bit synchronization and demodulation. The reproduced data thus demodulated is temporarily stored in the RAM 105. The stored data is subjected to error correction processing in the error correction circuit 106. The reproduced data thus corrected is sent to the copying permission information detection circuit 108. The copying permission information detection circuit 108 detects the superimposed copying permission information from the reproduced data. The copying permission information indicates which of the following types the recorded data is:

1) copying is possible; 2) copying is inhibited; and 3) copying of only one generation was permitted.

This detected information is sent to the disk reproduction stopping signal generation circuit 109. The disk identification code detection circuit detects the disk identification code added to the video data or audio data, and sends a result to the disk reproduction stopping signal generation circuit 109. The disk identification code identifies 1) a disk dedicated to reproduction, or 2) a recordable disk. If the copying permission information represents "copying of only one generation was permitted" and the disk identification code is judged to be a disk dedicated to reproduction, then the disk reproduction stopping signal generation circuit 109 makes the disk reproduction stopping signal 114 active. Upon the disk reproduction stopping signal 114 becoming active, the error correction circuit 106 destroys the reproduced data stored in the RAM and sends a flag indicating that error is incorrectable to the microcontroller 115. Upon the disk reproduction stopping signal 114 becoming active, the message information generation circuit 110 generates video or audio message data indicating that the reproduction has been stopped due to violation of copying consent. The above described message information may include where to make contact with a copyright managing organization (such as its telephone number, address, and the like). The message information generation circuit 110 may be a ROM or the like storing generated data. Normally, the selection circuit 111 selects reproduced data read out from the RAM. When the disk reproduction stopping signal 114 is active, the selection circuit 111 selects the message information supplied from the message information generation circuit 110.

As heretofore described, in the present embodiment, it is possible to inhibit reproduction of a pirated edition disk which is produced by temporarily recording a video signal or an audio signal from broadcasting which may be permitted to be copied by only one generation onto a DVD-R or DVD-RAM, and then copying the video signal or the audio signal onto a DVD-ROM on the basis of the DVD-R or DVD-RAM.

Furthermore, by outputting the message signal, users can recognize that the reproduction inhibition is not caused by a failure of the reproduction apparatus or a damage of the disk, but caused by a problem of the copyright. In addition, by displaying where to make contact with the copyright managing organization, it is possible to collect information for identifying a person who produced the pirated edition from users. Furthermore, in the case of a violation of a copyright, destruction of data is also conducted. In the case where the signal processing device 120 is formed as a single semiconductor chip, therefore, data is destroyed and cannot be read out, even if software of the micro-controller is falsified and correction impossibility flag is disregarded. If the disk reproduction stopping signal 114 in the disk reproduction stopping signal generation circuit 109 is made active, provided that the copying permission information indicates "copying of only one generation was permitted" and the disk identification code is judged to be a disk dedicated to reproduction or provided that the copying permission information is "copying is inhibited" and the disk identification code is judged to a recordable disk, then a DVD-R/RAM produced by illegally recording contents of a disk inhibited from being copied can also be prevented from being reproduced. According to the present embodiment, a reproduction apparatus capable of sufficiently protecting a copyright can be provided.

A second embodiment of the present invention will now be described.

FIG. 2 is a block diagram of a DVD reproduction apparatus showing the second embodiment.

The disk 101 reproduced in the present embodiment is intended for a DVD-ROM, a DVD-R, or a DVD-RAM. Among them, groove-shaped tracks are wobbled in the DVD-RAM/R. Therefore, a push-pull signal for tracking is modulated by the wobble. This wobble is required to effect tracking at the time of recording, and it does not exist in the disk dedicated to reproduction.

The present embodiment is the same as the first embodiment except the following three points:

1) A wobble detection circuit 116 is provided;

2) A push-pull signal terminal is provided in the preamplifier 103, and it is connected to the wobble detection circuit 116; and 3) When the wobble detection circuit 116 has judged that there is no wobbling, or when the disk identification code detection circuit 107 has judged the disk to be a disk dedicated to reproduction and simultaneously therewith the copying permission information detection circuit 108 has judged that copying of only one generation was permitted, the disk reproduction stopping signal generation circuit 109 makes the disk reproduction stopping signal 114 active.

In the present embodiment, at the same time that data is reproduced in the same way as the first embodiment, wobble detection is conducted by the wobble detection circuit 116. When either the wobble detection circuit 116 or the disk identification code detection circuit 107 has judged the disk to be a disk dedicated to reproduction and simultaneously therewith the copying permission information detection circuit 108 has judged that copying of only one generation was permitted, the disk reproduction stopping signal generation circuit 109 makes the disk reproduction stopping signal 114 active. Even if the disk identification code is rewritten, therefore, reproduction is inhibited certainly.

As heretofore described, in the present embodiment, it is possible to inhibit reproduction of a pirated edition disk which is produced by temporarily recording a video signal or an audio signal from broadcasting which may be permitted to be copied by only one generation onto a DVD-R or DVD-RAM, and then copying the video signal or the audio signal onto a DVD-ROM on the basis of the DVD-R or DVD-RAM. In the present embodiment, detection of a pirated edition is conducted certainly by judging the disk to be a disk dedicated to reproduction provided that there is no wobble or provided that the identification code indicates a disk dedicated to reproduction. Even if the condition that the identification code indicates a disk dedicated to reproduction is removed from the decision conditions, however, the same effects as the those of the first embodiment are obtained.

A third embodiment of the present invention will now be described by referring to drawing.

FIG. 3 is a block diagram of a DVD reproduction apparatus showing the third embodiment.

The present embodiment is the same as the first embodiment except the following three points:

1) A reflectance identification circuit 117 for processing reflectance information of a disk derived by the preamplifier 103 is provided;

2) A terminal for outputting information of the reflectance is provided in the preamplifier 103, and the terminal is connected to the reflectance identification circuit 117; and 3) When the reflectance identification circuit 117, the wobble detection circuit 116, or the disk identification code detection circuit 107 has judged the disk to be a disk dedicated to reproduction and simultaneously therewith the copying permission information detection circuit 108 has judged that copying of only one generation was permitted, the disk reproduction stopping signal generation circuit 109 makes the disk reproduction stopping signal 114 active.

At the same time that data is reproduced in the same way as the second embodiment, reflectance information is sent from the preamplifier 103 to the reflectance identifying circuit 117 in the present embodiment. The reflectance identifying circuit 117 has a threshold value for the reflectance and identifies a disk yielding a reflectance value which is equal to or larger than the threshold value, as a disk dedicated to reproduction.

When the reflectance identifying circuit 117, the wobble detection circuit 116, or the disk identification code detection circuit 107 has judged the disk to be a disk dedicated to reproduction and simultaneously therewith the copying permission information detection circuit 108 has judged that copying of only one generation was permitted, the disk reproduction stopping signal generation circuit 109 makes the disk reproduction stopping signal 114 active.

Even if the disk identification code is rewritten, reproduction is inhibited certainly. In the present embodiment, detection of a pirated edition is conducted certainly by judging the disk to be a disk dedicated to reproduction provided that the reflectance is equal to or larger than the threshold value, provided that there is no wobble, or provided that the identification code indicates a disk dedicated to reproduction. Even if the disk is judged to be a disk dedicated to reproduction provided that some combination of the three conditions is satisfied, however, the same effects as the those of the first embodiment are obtained.

A fourth embodiment of the present invention will now be described by referring to drawing.

FIG. 4 is a block diagram of a DVD reproduction apparatus showing the fourth embodiment.

Instead of inputting the output of the message information generation circuit 110 to the selection circuit 111 and inputting the output of the selection circuit 111 to the output control circuit 112, the output of the message information generation circuit 110 is written into the RAM 105 via a RAM write controller 119. Components other than them are common to the third embodiment. In the case where the disk reproduction stopping signal 114 has become active, overwriting is conducted on video data or audio data which should be originally outputted in the present embodiment. As a result, there are obtained the same effects as those of the case where the output of the message information generation circuit 110 is inputted to the selection circuit 111 and the output of the selection circuit 111 is inputted to the output control circuit 112 as in the second embodiment.

Furthermore, in the first to fourth embodiments, the message information for the user is generated in the reproduction apparatus. However, the same effects are also obtained by providing a terminal for outputting the disk reproduction stopping signal 114, sending the disk reproduction stopping signal 114 to a video data display apparatus, an audio output apparatus, a compressed video data or audio data decompression apparatus, or the like, and causing the apparatus receiving the disk reproduction stopping signal 114 to generate the message information.

As heretofore described, reproduction is inhibited according to the present invention in the case where the copying permission information superimposed on the video signal or embedded therein indicates that copying of only one generation was permitted and the disk is judged to be a DVD-ROM. As a result, it is possible to inhibit reproduction from a disk which is produced by temporarily recording video or audio data permitted as to copy of one generation onto a DVD-R/RAM and thereafter illegally copying the recorded data to a DVD-ROM. In addition, in the case where reproduction is inhibited, the cause of the reproduction stoppage can be reported to the user correctly.

Throughout these embodiments, function operation of the circuit for detecting the copying permission information and the disk type, the reproduction stopping signal generation circuit, and the like can be effected by execution of them in a processor in a program form. Therefore, at least a part of the circuit configuration can be implemented in a software fashion by execution, in the processor, of a program stored in memories.

What is claimed is:

1. A reproduction apparatus for reproducing video data and/or audio data from a medium dedicated to reproduction or a recordable medium having video data and/or audio data recorded thereon, said video data and/or audio data being generated by superimposing information concerning copying permission on a signal of digitized video data and/or a signal of digitized audio data or embedding the information therein, said reproduction apparatus comprising:
    a reproducing unit which reproduces the information concerning copying permission superimposed on or embedded in the video data and/or audio data;
    a determining unit which determines whether the medium to be reproduced is a medium dedicated to reproduction or a recordable medium; and
    a stopping unit which stops reproduction in response to the information reproduced by said reproducing unit indicating that copying once was permitted and a result of the determining by said determining unit indicating that the medium is a medium dedicated to reproduction.

2. A reproduction apparatus according to claim 1, wherein the stopping unit is responsive to both the information reproduced by the reproducing unit indicating that copying once was permitted and the result of the determining by the determining unit indicating that the medium is a medium dedicated to reproduction to judge presence of an unauthorized copy in the medium and to stop reproduction to protect information in the unauthorized copy from being reproduced.

3. A reproduction apparatus for reproducing video data and/or audio data from a medium dedicated to reproduction or a recordable medium having video data and/or audio data recorded thereon, said video data and/or audio data being generated by superimposing information concerning copying consent on a signal of digitized video data and/or a signal of digitized audio data, said reproduction apparatus comprising:
 a reproducing unit which reproduces the information concerning copying consent superimposed on the video data and/or audio data;
 a determining unit which determines whether the medium to be reproduced is a medium dedicated to reproduction or a recordable medium;
 an error correcting unit which conducts error correction according to an added correction code; and
 a destroying unit which destroys reproduced data so as to make the video data and/or audio data non-reproducible in response to the information reproduced by said reproducing unit indicating that copying once was permitted and a result of the determining by said determining unit indicating that the medium is a medium dedicated to reproduction.

4. A reproduction apparatus according to claim 3, wherein the destroying unit is responsive to both the information reproduced by the reproducing unit indicating that copying once was permitted and the result of the determining by the determining unit indicating that the medium is a medium dedicated to reproduction to judge presence of an unauthorized copy in the medium and to destroy reproduced data to protect information in the unauthorized copy from being reproduced.

5. A reproduction apparatus for reproducing video data and/or audio data from a medium dedicated to reproduction or a recordable medium having video data and/or audio data recorded thereon, said video data and/or audio data being generated by superimposing information concerning copying consent on a signal of digitized video data and/or a signal of digitized audio data, said reproduction apparatus comprising:
 a reproducing unit which reproduces the information concerning copying consent superimposed on the video data and/or audio data;
 a determining unit which determines whether the medium to be reproduced is a medium dedicated to reproduction or a recordable medium;
 an error correcting unit which conducts error correction according to an added correction code; and
 a destroying unit which destroys video data and/or audio data so as to make error detection of video data and/or audio data not yet subjected to error correction processing possible and make error correction thereof impossible in response to the information reproduced by said reproducing unit indicating that copying once was permitted and a result of the determination by the determining unit indicating that the medium is a medium dedicated to reproduction.

6. A reproduction apparatus according to claim 5, wherein the destroying unit is responsive to both the information reproduced by the reproducing unit indicating that copying once was permitted and the result of the determination by the determining unit indicating that the medium is a medium dedicated to reproduction to judge presence of an unauthorized copy in the medium and to destroy video data and/or audio data to protect information in the unauthorized copy from being reproduced.

7. A reproduction apparatus for reproducing video data and/or audio data from a medium dedicated to reproduction or a recordable medium having video data and/or audio data recorded thereon, said video data and/or audio data being generated by superimposing information concerning copying consent on a signal of digitized video data and/or a signal of digitized audio data, said reproduction apparatus comprising:
 a reproducing unit which reproduces the information concerning copying consent superimposed on the video data and/or audio data;
 an identifying unit which identifies whether the medium to be reproduced is a medium dedicated to reproduction or a recordable medium;
 a stopping unit which stops reproduction in response to the information reproduced by said reproducing unit indicating that copying once was permitted and a result of the identification by the identifying unit indicating that the medium is a medium dedicated to reproduction; and
 an output unit which outputs video data and/or audio data representing a reason of stoppage.

8. A reproduction apparatus according to claim 7, wherein the stopping unit is responsive to both the information reproduced by the reproducing unit indicating that copying once was permitted and the result of the identification by the identifying unit indicating that the medium is a medium dedicated to reproduction to judge presence of an unauthorized copy in the medium and to stop reproduction to protect information in the unauthorized copy from being reproduced.

9. A reproduction apparatus for reproducing video data and/or audio data from a medium dedicated to reproduction or a recordable medium having video data and/or audio data recorded thereon, said video data and/or audio data being generated by superimposing information concerning copying consent on a signal of digitized video data and/or a signal of digitized audio data, said reproduction apparatus comprising:
 a reproducing unit which reproduces the information concerning copying consent superimposed on the video data and/or audio data;
 an identifying unit which identifies whether the medium to be reproduced is a medium dedicated to reproduction or a recordable medium;
 an error correcting unit which conducts error correction according to an added correction code;
 a destroying unit which destroys video data and/or audio data so as to make error detection of video data and/or audio data not yet subjected to error correction processing possible and make error correction thereof impossible in response to the information reproduced by said reproducing unit indicating that copying once was permitted and a result of the identification by the identifying unit indicating that the medium is a medium dedicated to reproduction; and
 an output unit which outputs video data and/or audio data representing a reason why reproduction is not possible.

10. A reproduction apparatus according to claim 9, wherein the destroying unit is responsive to both the information reproduced by the reproducing unit indicating that copying once was permitted and the result of the identification by the identifying unit indicating that the medium is a medium dedicated to reproduction to judge presence of an unauthorized copy in the medium and to destroy video data and/or audio data to protect information in the unauthorized copy from being reproduced.

11. A reproduction apparatus for reproducing video data and/or audio data from a medium dedicated to reproduction or a recordable medium having video data and/or audio data recorded thereon, said video data and/or audio data being generated by superimposing information concerning copying consent on a signal of digitized video data and/or a signal of digitized audio data, said reproduction apparatus comprising:
　　a reproducing unit which reproduces the information concerning copying consent superimposed on the video data and/or audio data;
　　a determining unit which determines whether the medium to be reproduced is a medium dedicated to reproduction or a recordable medium;
　　a stopping unit which stops reproduction in response to the information reproduced by said reproducing unit indicating that copying once was permitted and a result of the determining by the determining unit indicating that the medium is a medium dedicated to reproduction; and
　　an output unit which outputs a control signal, the control signal instructing a video signal and/or audio signal representing a reason of stoppage to be outputted.

12. A reproduction apparatus according to claim 11, wherein the stopping unit is responsive to both the information reproduced by the reproducing unit indicating that copying once was permitted and the result of the determining by the determining unit indicating that the medium is a medium dedicated to reproduction to judge presence of an unauthorized copy in the medium and to stop reproduction to protect information in the unauthorized copy from being reproduced.

13. A reproduction apparatus (or reproducing video data and/or audio data from a medium dedicated to reproduction or a recordable medium having video data and/or audio data recorded thereon, said video data and/or audio data being generated by superimposing information concerning copying consent on a signal of digitized video data and/or a signal of digitized audio data, said reproduction apparatus comprising:
　　a reproducing unit which reproduces the information concerning copying consent superimposed on the video data and/or audio data;
　　a determining unit which determines whether the medium to be reproduced is a medium dedicated to reproduction or a recordable medium;
　　an error correcting unit which conducts error correction according to an added correction code;
　　a destroying unit which destroys video data and/or audio data so as to make error detection of video data and/or audio data not yet subjected to error correction processing possible and make error correction thereof impossible in response to the information reproduced by said reproducing unit indicating that copying once was permitted and a result of the determining by the determining unit indicating that the medium is a medium dedicated to reproduction; and
　　an output unit which outputs a control signal, the control signal instructing video data and/or audio data representing a reason why reproduction is impossible to be outputted.

14. A reproduction apparatus according to claim 13, wherein the destroying unit is responsive to both the information reproduced by the reproducing unit indicating that copying once was permitted and the result of the determining by the determining unit indicating that the medium is a medium dedicated to reproduction to judge presence of an unauthorized copy in the medium and to destroy reproduced data to protect information in the unauthorized copy from being reproduced.

15. A reproduction apparatus for reproducing video data and/or audio data from a medium dedicated to reproduction or a recordable medium having video data and/or audio data and a medium identification code recorded thereon, said video data and/or audio data being generated by superimposing information concerning copying consent on a signal of digitized video data and/or a signal of digitized audio data, said medium identification code identifying the medium dedicated to reproduction or the recordable medium, said reproduction apparatus comprising:
　　a permission information reproducing circuit reproducing the information concerning copying consent superimposed on the video data and/or audio data;
　　a medium identification code detecting circuit detecting the medium identification code; and
　　a reproduction stopping circuit stopping reproduction in response to the information reproduced by said permission information reproducing circuit indicating that copying once was permitted and the medium identification code indicating a medium dedicated to reproduction.

16. A reproduction apparatus for reproducing video data and/or audio data according to claim 15, wherein said medium identification code detecting circuit and said reproduction stopping circuit are integrated into a single semiconductor device.

17. A reproduction apparatus according to claim 15, wherein the reproduction stopping circuit is responsive to both the information reproduced by the permission information reproducing circuit indicating that copying once was permitted and the medium identification code indicating a medium dedicated to reproduction to judge presence of an unauthorized copy in the medium and to stop reproduction to protect information in the unauthorized copy from being reproduced.

18. A reproduction apparatus for reproducing video data and/or audio data from a medium dedicated to reproduction or a recordable medium having video data and/or audio data recorded thereon, said video data and/or audio data being generated by superimposing information concerning copying consent on a signal of digitized video data and/or a signal of digitized audio data, said reproduction apparatus comprising:
　　a reproducing unit for reproducing the information concerning copying consent superimposed on the video data and/or audio data;
　　a detecting unit for detecting reflectance of a disk;
　　a determining unit for determining whether the disk is a recordable medium or a medium dedicated to reproduction on the basis of the reflectance of the disk; and
　　a stopping unit for stopping reproduction in response to the information reproduced by said reproducing unit indicating that copying once was permitted and said determining unit indicating that the medium is a medium dedicated to reproduction.

19. A reproduction apparatus according to claim 18, wherein the stopping unit is responsive to both the information reproduced by the reproducing unit indicating that copying once was permitted and the determining unit indicating that the medium is a medium dedicated to reproduction to judge presence of an unauthorized copy in the medium and to stop reproduction to protect information in the unauthorized copy from being reproduced.

20. A reproduction apparatus for reproducing video data and/or audio data from a medium dedicated to reproduction or a recordable medium having video data and/or audio data and a medium identification code recorded thereon, said video data and/or audio data being generated by superimposing information concerning copying consent on a signal of digitized video data and/or a signal of digitized audio data, said medium identification code identifying the medium dedicated to reproduction or the recordable medium, said reproduction apparatus comprising:
- a reproducing unit for reproducing the information concerning copying consent superimposed on the video data and/or audio data;
- a medium identification code detecting unit for detecting the medium identification code;
- a reflectance detecting unit for detecting reflectance of a disk;
- a determining unit for determining whether the disk is a recordable medium or a medium dedicated to reproduction on the basis of the reflectance of the disk; and
- a stopping unit for stopping reproduction provided that the information reproduced by said reproducing unit indicates that copying once was permitted and the medium identification code or the determining unit indicates a medium dedicated to reproduction.

21. A reproduction apparatus according to claim 20, wherein the stopping unit is responsive to both the information reproduced by the reproducing unit indicating that copying once was permitted and the medium identification code or the determining unit indicating a medium dedicated to reproduction to judge presence of an unauthorized copy in the medium and to stop reproduction to protect information in the unauthorized copy from being reproduced.

22. A reproduction apparatus for reproducing video data and/or audio data from a medium dedicated to reproduction or a recordable medium having video data and/or audio data recorded thereon, said video data and/or audio data being generated by superimposing information concerning copying consent on a signal of digitized video data and/or a signal of digitized audio data, said medium dedicated to reproduction having no wobbled grooves, said recordable medium having wobbled grooves, said reproduction apparatus comprising:
- a reproducing unit for reproducing the information concerning copying consent superimposed on the video data and/or audio data;
- a wobble detecting unit for detecting wobbled grooves existing on a disk; and
- a stopping unit for stopping reproduction provided that the information reproduced by said reproducing unit indicates that copying once was permitted and said wobble detecting unit does not detect wobbled grooves.

23. A reproduction apparatus according to claim 22, wherein the stopping unit is responsive to both the information reproduced by the reproducing unit indicating that copying once was permitted and the wobble detecting unit not detecting wobbled grooves to judge presence of an unauthorized copy in the medium and to stop reproduction to protect information in the unauthorized copy from being reproduced.

24. A reproduction apparatus for reproducing video data and/or audio data from a medium dedicated to reproduction or a recordable medium having video data and/or audio data and a medium identification code recorded thereon, said video data and/or audio data being generated by superimposing information concerning copying consent on a signal of digitized video data and/or a signal of digitized audio data, said medium identification code identifying the medium dedicated to reproduction or the recordable medium, said medium dedicated to reproduction having no wobbled grooves, said recordable medium having wobbled grooves, said reproduction apparatus comprising:
- a reproducing unit for reproducing the information concerning copying consent superimposed on the video data and/or audio data;
- a wobble detecting unit for detecting wobbled grooves existing on a disk;
- a medium identification code detecting unit for detecting the medium identification code; and
- a stopping unit for stopping reproduction in response to the information reproduced by said reproducing unit indicating that copying once was permitted and that said wobble detecting unit does not detect wobbled grooves or the medium identification code indicates a medium dedicated to reproduction.

25. A reproduction apparatus according to claim 24, wherein the stopping unit is responsive to both the information reproduced by the reproducing unit indicating that copying once was permitted and the wobble detecting unit not detecting wobbled grooves or the medium identification code indicating a medium dedicated to reproduction to judge presence of an unauthorized copy in the medium and to stop reproduction to protect information in the unauthorized copy from being reproduced.

26. A reproduction method for reproducing video data and/or audio data from a medium dedicated to reproduction or a recordable medium having video data and/or audio data recorded thereon, said video data and/or audio data being generated by superimposing information concerning copying consent on a signal of digitized video data and/or a signal of digitized audio data, said reproduction method comprising the steps of:
- reproducing the information concerning copying consent superimposed on the video data and/or audio data;
- determining whether the medium to be reproduced is a medium dedicated to reproduction or a recordable medium; and
- stopping reproduction in response to the information reproduced by said information reproducing step indicating that copying once was permitted and a result of said determining step indicating a medium dedicated to reproduction.

27. A reproduction method according to claim 26, wherein the stopping step is responsive to both the information reproduced by the information reproducing step indicating that copying once was permitted and the result of the determining step indicating a medium dedicated to reproduction to judge presence of an unauthorized copy in the medium and to stop reproduction to protect information in the unauthorized copy from being reproduced.

28. A reproduction method for reproducing video data and/or audio data from a medium dedicated to reproduction or a recordable medium having video data and/or audio data recorded thereon, said video data and/or audio data being generated by superimposing information concerning copying consent on a signal of digitized video data and/or a signal of digitized audio data, said reproduction method comprising the steps of:
- reproducing the information concerning copying consent superimposed on the video data and/or audio data;
- determining whether the medium to be reproduced is a medium dedicated to reproduction or a recordable medium;

conducting error correction according to an added correction code; and in response to the information reproduced by said information reproducing step indicating that copying once was permitted and a result of said determining step indicating a medium dedicated to reproduction, destroying reproduced data so as to make reproduction of the video data and/or audio data impossible and simultaneously judging error correction to be impossible.

29. A reproduction method according to claim 28, wherein the destroying step is responsive to both the information reproduced by the information reproducing step indicating that copying once was permitted and the result of the determining step indicating a medium dedicated to reproduction to judge presence of an unauthorized copy in the medium and to destroy video data and/or audio data to protect information in the unauthorized copy from being reproduced.

30. A computer-readable program encoded in a memory medium, said program being executed in a computer to execute operation for reproducing video data and/or audio data from a medium dedicated to reproduction or a recordable medium having video data and/or audio data recorded thereon, said video data and/or audio data being generated by superimposing information concerning copying consent on a signal of digitized video data and/or a signal of digitized audio data, said operation comprising:

reproducing the information concerning copying consent superimposed on the video data and/or audio data;

determining whether the medium to be reproduced is a medium dedicated to reproduction or a recordable medium; and stopping reproduction in response to information reproduced by said information reproducing step indicating that copying once was permitted and a result of said determining step indicating a medium dedicated to reproduction.

31. A computer-readable program according to claim 30, wherein the stopping step is responsive to both the information reproduced by the information reproducing step indicating that copying once was permitted and the result of the determining step indicating a medium dedicated to reproduction to judge presence of an unauthorized copy in the medium and to stop reproduction to protect information in the unauthorized copy from being reproduced.

* * * * *